(12) United States Patent
Qu et al.

(10) Patent No.: US 11,876,919 B2
(45) Date of Patent: Jan. 16, 2024

(54) TERMINAL DEVICE

(71) Applicant: VIVO MOBILE COMMUNICATION CO., LTD., Guangdong (CN)

(72) Inventors: Jiangling Qu, Guangdong (CN); Dongcun Cheng, Guangdong (CN); Zhengjun Luo, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 298 days.

(21) Appl. No.: 17/525,642

(22) Filed: Nov. 12, 2021

(65) Prior Publication Data

US 2022/0078269 A1  Mar. 10, 2022

Related U.S. Application Data

(63) Continuation-in-part of application No. PCT/CN2020/086415, filed on Apr. 23, 2020.

(30) Foreign Application Priority Data

May 15, 2019 (CN) .......................... 201910403615.1

(51) Int. Cl.
*H04M 1/02* (2006.01)
(52) U.S. Cl.
CPC ....... *H04M 1/0266* (2013.01); *H04M 1/0279* (2013.01)
(58) Field of Classification Search
CPC ............. H04M 1/0266; H04M 1/0279; H04M 2250/52
See application file for complete search history.

(56) References Cited

U.S. PATENT DOCUMENTS

2018/0295222 A1  10/2018 Jung et al.
2019/0208044 A1*  7/2019 Lee ...................... H10K 50/844
(Continued)

FOREIGN PATENT DOCUMENTS

CN    105049687 A    11/2015
CN    107241467 A    10/2017
(Continued)

OTHER PUBLICATIONS

International Search Report of International Application No. PCT/CN2020/086415 dated Jul. 15, 2020.
(Continued)

*Primary Examiner* — Keith Ferguson
(74) *Attorney, Agent, or Firm* — IP & T GROUP LLP

(57) ABSTRACT

A terminal device includes: a housing; a display assembly, disposed on a housing and provided with a light transmitting hole; an optical component, disposed in a housing and opposite to the light transmitting hole; a secondary display assembly, disposed in the housing; a reflection part, movably disposed in the housing; and a drive component, disposed in the housing, connected to the reflection part, and driving the reflection part to move between a first state and a second state, where in the first state, the reflection part is located outside an optical channel between the optical component and the light transmitting hole, and in the second state, the reflection part is located between the light transmitting hole and the optical component, and reflects, to the light transmitting hole, light emitted by the secondary display assembly.

12 Claims, 5 Drawing Sheets

(56) References Cited

U.S. PATENT DOCUMENTS

| | | |
|---|---|---|
| 2019/0384360 A1 | 12/2019 | Tang |
| 2019/0393280 A1 | 12/2019 | Gao |
| 2020/0160775 A1 | 5/2020 | Zhang et al. |
| 2021/0141583 A1 | 5/2021 | Xia et al. |
| 2021/0272302 A1 | 9/2021 | Yang |

FOREIGN PATENT DOCUMENTS

| | | | |
|---|---|---|---|
| CN | 107635038 | A | 1/2018 |
| CN | 108254963 | A | 7/2018 |
| CN | 108376019 | A | 8/2018 |
| CN | 108965519 | A | 12/2018 |
| CN | 109348097 | A | 2/2019 |
| CN | 109451106 | A | 3/2019 |
| CN | 109584741 | A | 4/2019 |
| CN | 109597267 | A | 4/2019 |
| CN | 109597268 | A | 4/2019 |
| CN | 109599029 | A | 4/2019 |
| CN | 110035158 | A | 7/2019 |
| CN | 110088820 | A | 8/2019 |
| CN | 110211500 | A | 9/2019 |
| CN | 209930366 | U | 1/2020 |
| JP | 2004080147 | A * | 3/2004 |
| KR | 10-2013-0104764 | A | 9/2013 |
| KR | 10-2018-0113421 | A | 10/2018 |

OTHER PUBLICATIONS

Written Opinion of the International Searching Authority of International Application No. PCT/CN2020/086415 dated Jul. 15, 2020.
First Office Action of Priority Application No. 201910403615.1 dated May 8, 2020.
The Second Office Action of Priority Application No. 201910403615.1 dated Sep. 16, 2020.
Supplemental Research of Priority Application No. 201910403615.1.

* cited by examiner

TERMINAL DEVICE

CROSS-REFERENCE TO RELATED APPLICATIONS

This application is a Bypass Continuation-in-part application of PCT/CN2020/086415, filed on Apr. 23, 2020, which claims priority to Chinese Patent Application No. 201910403615.1 filed on May 15, 2019, which are incorporated herein by reference in their entirety.

TECHNICAL FIELD

The present disclosure relates to the field of communications technologies, and in particular, to a terminal device.

BACKGROUND

With the development of the terminal device industry, the pursuit of ultimate appearance and a high screen-to-body ratio is a current development direction. This can not only satisfy an appearance requirement of a consumer, but also satisfy an audio-visual entertainment requirement of the consumer.

SUMMARY

The present disclosure provides a terminal device, the terminal device includes:
a housing;
a display assembly, where the display assembly is disposed on the housing, and a light transmitting hole is disposed on the display assembly;
an optical component, where the optical component is disposed in the housing, and the optical component is opposite to the light transmitting hole;
a secondary display assembly, where the secondary display assembly is disposed in the housing;
a reflection part, where the reflection part is movably disposed in the housing; and
a drive component, where the drive component is disposed in the housing, and the drive component is connected to the reflection part, and drives the reflection part to move between a first state and a second state; in the first state, the reflection part is located outside an optical channel between the optical component and the light transmitting hole; and in the second state, the reflection part is located between the light transmitting hole and the optical component, and reflect, to the light transmitting hole, light emitted by the secondary display assembly.

BRIEF DESCRIPTION OF DRAWINGS

The accompanying drawings described herein are used to provide further understanding of the present disclosure and constitute a part of the present disclosure. The exemplary embodiments of the present disclosure and descriptions thereof are used to explain the present disclosure, and do not constitute an undue limitation on the present disclosure. In the accompanying drawings.

Figure 1:
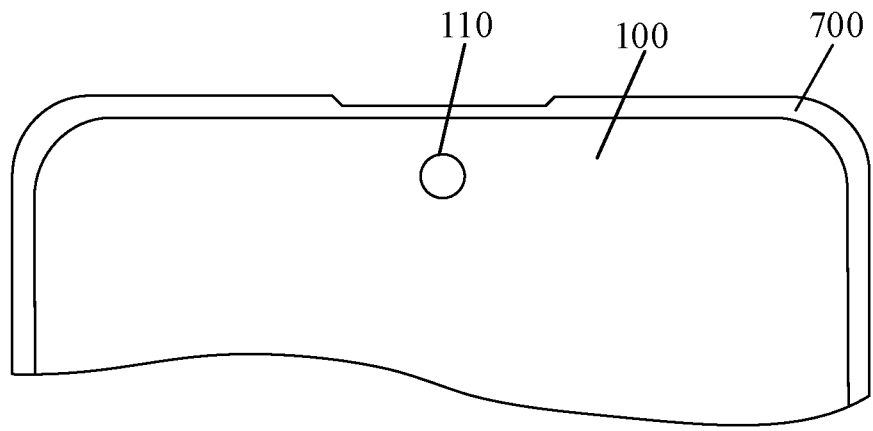
FIG. 1 is a schematic structural diagram of a partial structure of a terminal device in a first state disclosed in an embodiment of the present disclosure.
Figure 2:
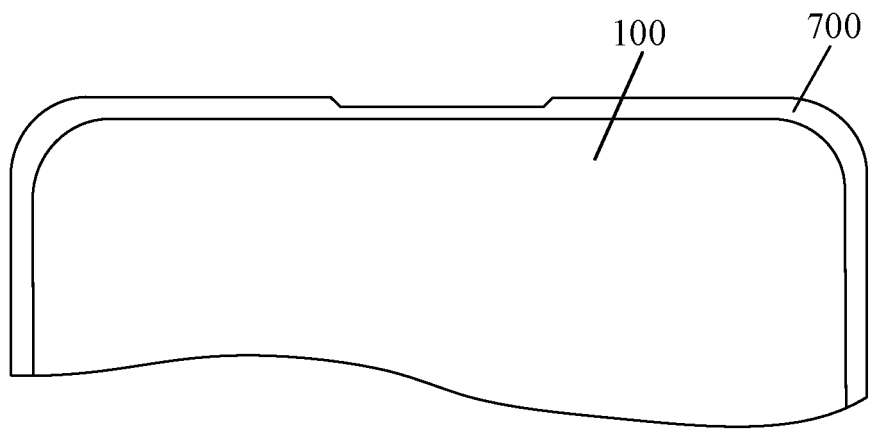
FIG. 2 is a schematic structural diagram of a partial structure of a terminal device in a second state disclosed in an embodiment of the present disclosure.
Figure 3:
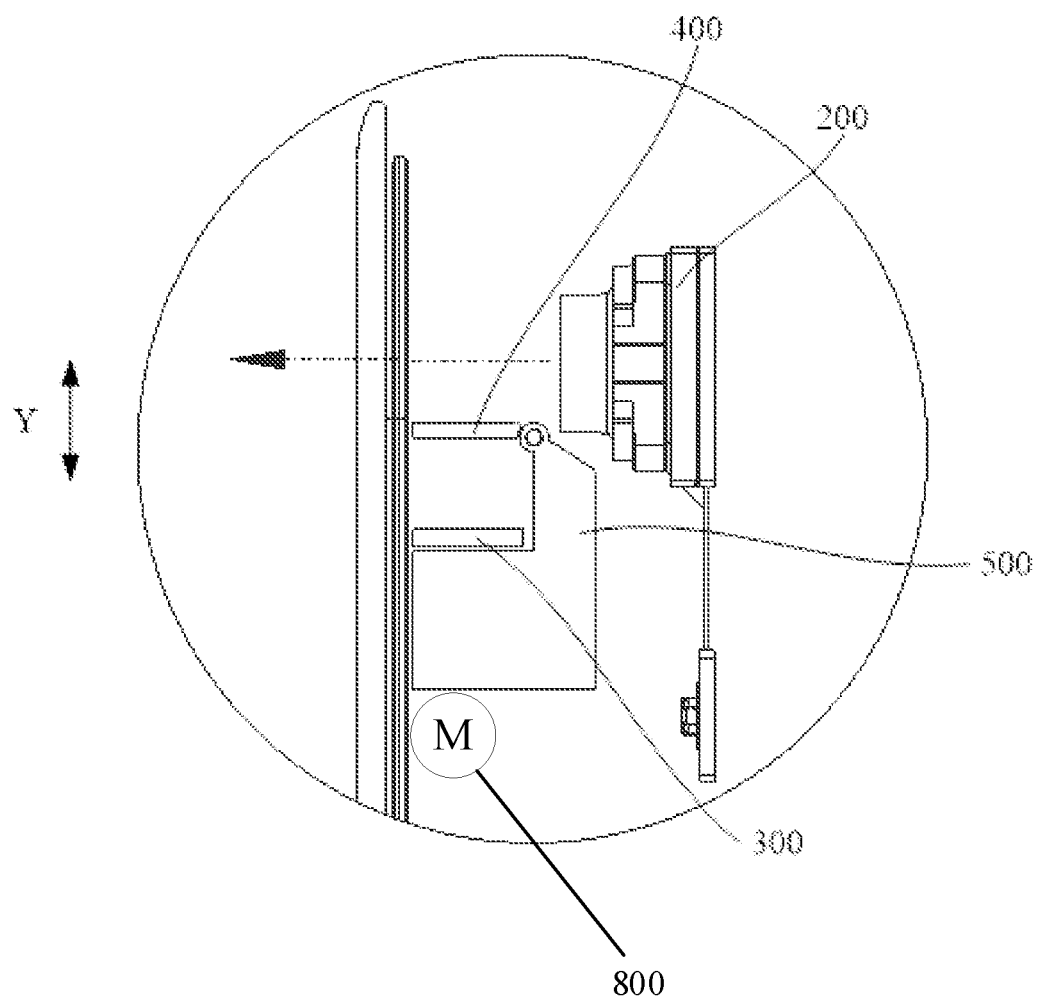
FIG. 3 is a side view of a partial structure of a terminal device in a first state disclosed in an embodiment of the present disclosure.
Figure 4:
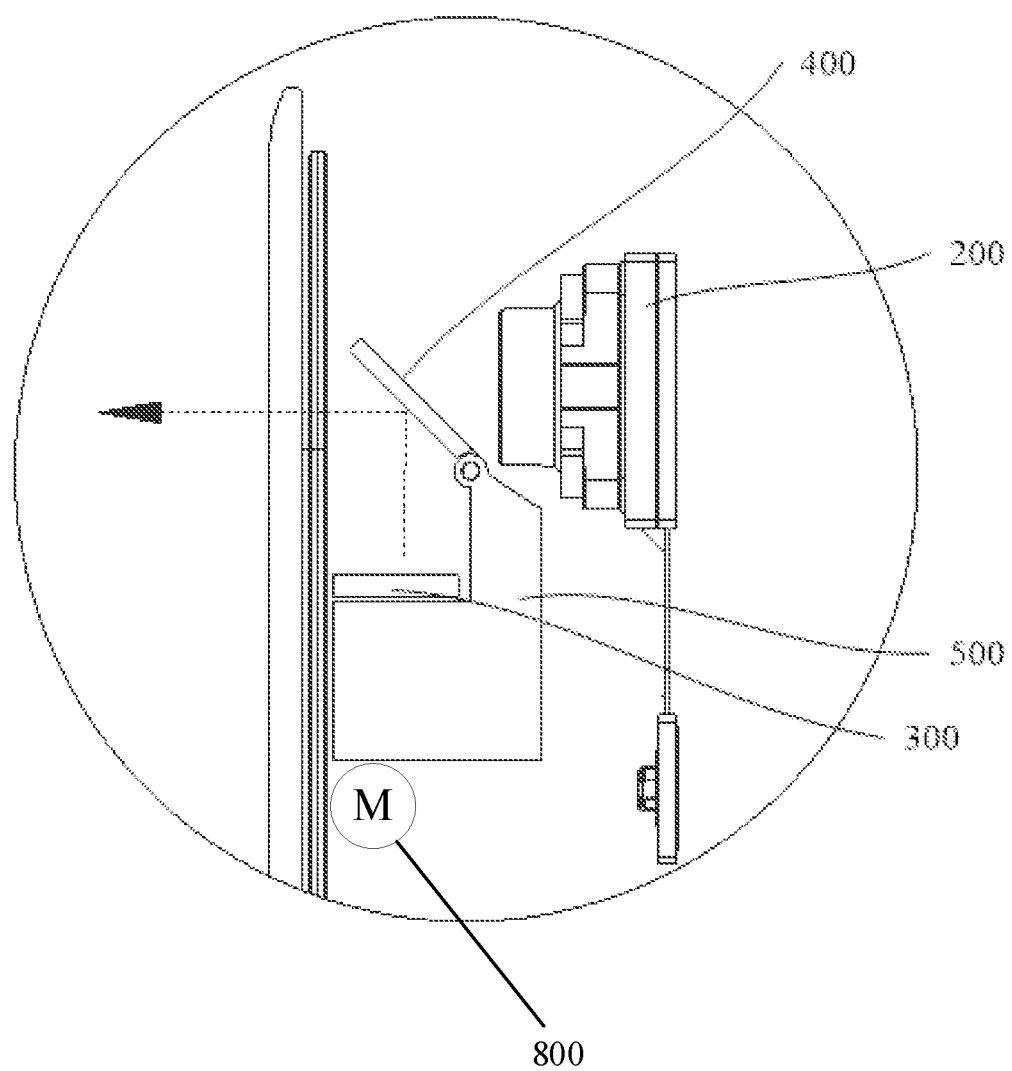
FIG. 4 is a side view of a partial structure of a terminal device in a second state disclosed in an embodiment of the present disclosure.
Figure 5:
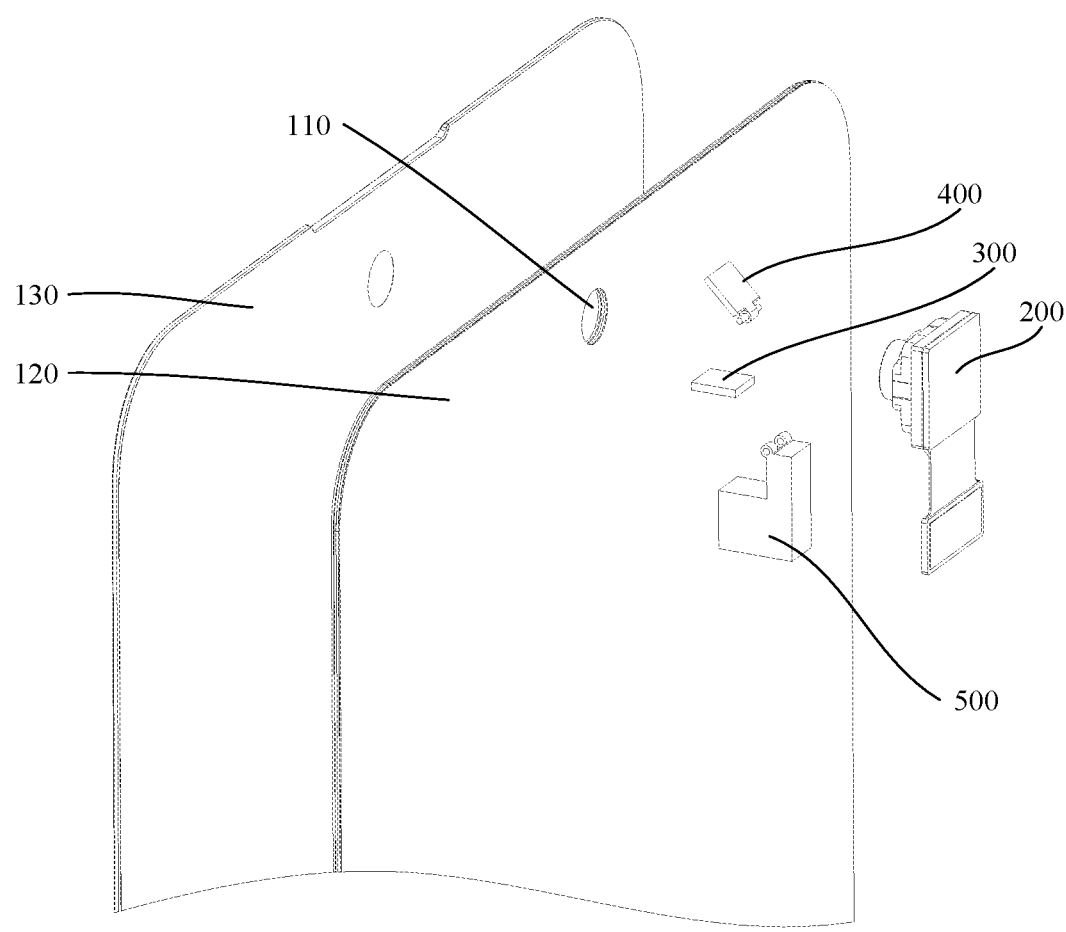
FIG. 5 is an exploded diagram of a partial structure of a terminal device according to an embodiment of the present disclosure.

Dotted lines with arrows in FIG. 3 and FIG. 4 indicate optical path directions.

DESCRIPTION OF REFERENCE NUMERALS

100—Display assembly, 110—Light transmitting hole, 120—Display screen, 130—Transparent cover, 200—Optical component, 300—Secondary display assembly, 400—Reflection part, 410—Second sleeve, 500—Mounting base, 510—Base body, 511—Mounting surface, 512—Mounting part, 513—Protrusion part, 520—First sleeve, 600—Rotation shaft, housing—700, Drive component—800.

DESCRIPTION OF EMBODIMENTS

To make the objects, technical solutions, and advantages of the present disclosure clearer, the following clearly describes the technical solutions of the present disclosure with reference to specific embodiments of the present disclosure and corresponding accompanying drawings. Apparently, the described embodiments are only some rather than all embodiments of the present disclosure. Based on the embodiments of the present disclosure, all other embodiments obtained by a person of ordinary skill in the art fall within the protection scope of the present disclosure.

Components such as a camera and a sensor need to be disposed on a side of the terminal device on which a display assembly is disposed, to collect information such as an image. Therefore, such components are one of structures that restrict a screen-to-body ratio of the terminal device. The camera is used as an example. To maximize the screen-to-body ratio of the terminal device, in one manner, a hole is disposed on the display assembly, and the camera is disposed under the display assembly. Light in an external environment may enter the camera through the hole on the display assembly, so that the camera can perform imaging; and in another manner, a hole is disposed on a housing, and the camera may enter and exit the housing.

However, in the first manner, a hole area on the display assembly cannot be displayed, and therefore, the screen-to-body ratio of the terminal device is still relatively low; and in the second manner, integrity of the housing is damaged, which causes poor appearance quality of the terminal device, and also poses a relatively great challenge to waterproof and dust-proof performance of the terminal device.

The technical solutions disclosed in the embodiments of the present disclosure are described in detail below with reference to the accompanying drawings.

As shown in FIG. 1 to FIG. 6, an embodiment of the present disclosure discloses a terminal device, and the terminal device includes a housing 700, a display assembly 100, an optical component 200, a secondary display assembly 300, a reflection part 400, and a drive component 800.

The housing is a basis on which other components of the terminal device are mounted, and the housing may include a middle frame. The display assembly 100 is disposed on the housing 700, and may be disposed on the middle frame. A light transmitting hole 110 is disposed on the display assembly 100, the display assembly 100 may include a display screen 120 and a transparent cover 130, and the transparent cover 130 may cover the display screen 120. Optionally, the light transmitting hole 110 may be a round hole, and may also be a hole in another shape. This is not limited in the present disclosure.

The optical component 200 is disposed in the housing 700, and the optical component 200 may emit light, or may receive light. Optionally, in this embodiment of this application, the optical component 200 may include at least one of a camera, a sensor, or a supplement lamp. Certainly, the optical component 200 may also include another component that can emit light or can receive light. In this embodiment of the present disclosure, the optical component 200 is opposite to the light transmitting hole 110. Therefore, light in an external environment can pass through the light transmitting hole 110 and enter the optical component 200, or light emitted by the optical component 200 can be emitted through the light transmitting hole 110. A position of the light transmitting hole 110 on the display assembly 100 may be selected based on a specific form of the optical component 200. For example, the light transmitting hole 110 may be located on the top of the display assembly 100, and for example the light transmitting hole 110 may be specifically located at the top left corner, the top right corner, or the middle part of the display assembly 100.

The secondary display assembly 300 is disposed in the housing 700, the secondary display assembly 300 has a display function. The reflection part 400 is movably disposed in the housing 700, the reflection part 400 can reflect information displayed by the secondary display assembly 300 to the light transmitting hole 110, and a user can observe, from an appearance surface of the terminal device, the information displayed by the secondary display assembly 300. Optionally, the reflection part 400 may be a plane mirror, or another structure with a light reflection capability. It should be noted that, during mounting of the secondary display assembly 300 and the reflection part 400, structural parameters such as mounting positions and mounting angles of the secondary display assembly 300 and the reflection part 400 may be adjusted, so that the secondary display assembly 300 and the reflection part 400 do not interfere with the optical component 200, to further ensure that both the optical component 200 and the secondary display assembly 300 can independently work normally.

The drive component 800 is disposed in the housing 700, and the drive component 800 is connected to the reflection part 400, and can drive the reflection part to move between a first state and a second state. Optionally, the drive component 800 may be a drive motor, a magnetic drive component, or another structure that can drive the reflection part 400 to move. In the first state, the optical component 200 works, and the secondary display assembly 300 does not work. In this case, an optical channel is formed between the light transmitting hole 110 on the display assembly 100 and the optical component 200, and the reflection part 400 is located outside the optical channel, so that the light in the external environment may pass through the light transmitting hole 110 and enter the optical component 200, or the light emitted by the optical component 200 can be emitted through the light transmitting hole 110. In the second state, the optical component 200 does not work, and the secondary display assembly 300 works. In this case, the reflection part 400 is located between the light transmitting hole 110 and the optical component 200, and reflects, to the light transmitting hole 110, the light emitted by the secondary display assembly 300, so that the user can observe the information displayed by the secondary display assembly 300. In this second state, the information displayed by the secondary display assembly 300 and the information displayed by the display component 100 may be concatenated to form a complete picture, and there is no boundary in a picture observed by the user. Certainly, the secondary display assembly 300 can also display information independently, and does not cooperate with the display component 100.

It can be learned from the foregoing content that the optical component 200 and the secondary display assembly 300 may work independently. When the optical component 200 does not work, the light emitted by the secondary display assembly 300 may be reflected to the light transmitting hole 110 by the reflection part 400, so that information may be displayed on the light transmitting hole 110, thereby increasing utilization of a display area of the display assembly 100, to increase a screen-to-body ratio of the terminal device. In addition, in this solution, a hole for the optical component 200 to enter or exit the housing does not need to be disposed on the housing, so that integrity of the housing is not damaged, appearance quality of the terminal device is improved, and waterproof and dust-proof performance of the terminal device is better.

In addition, in this embodiment of the present disclosure, the reflection part 400 is movably disposed in the housing, a position of the reflection part 400 can be adjusted, so that the secondary display assembly 300 and the optical component 200 independently work normally. Therefore, positions at which the secondary display assembly 300 and the reflection part 400 can be set more flexibly, and the information displayed by the secondary display assembly 300 can be more accurately output to the light transmitting hole 110.

To reduce, as much as possible, space occupied by the secondary display assembly 300, in this embodiment of the present disclosure, the secondary display assembly 300 is parallel to an axis direction of the light transmitting hole 110. In other words, a plane in which the secondary display assembly 300 is located is parallel to the axis direction of the light transmitting hole 110, so that the secondary display assembly 300 can fully use space in a thickness direction of the terminal device. Optionally, to enable the information displayed by the secondary display assembly 300 to be more accurately output to the light transmitting hole 110, in the second state, an included angle between the reflection part 400 and the secondary display assembly 300 is 45°. In this case, the light emitted by the secondary display assembly 300 may be output in a direction parallel to an axis of the light transmitting hole 110.

In some embodiments, the reflection part 400 is disposed in at least the following two manners: In the first manner, the reflection part 400 is movably disposed in the housing 700; and in the second manner, the reflection part 400 is rotatably disposed in the housing 700. In the second setting manner, moving space of the reflection part 400 is reduced, and therefore, it is more conducive to structural layout of the terminal device. Therefore, in some optional embodiments, the reflection part 400 in the present disclosure is rotatably disposed in the housing 700, in other words, the reflection part 400 is hinged to the housing 700, and the drive part drives the reflection part 400 to rotate relative to the housing 700.

When the reflection part 400 rotates relative to the housing 700, in the second state, the reflection part 400 may accurately reflect the information displayed by the secondary display assembly 300 to the light transmitting hole 110. A position of the reflection part 400 in the first state is relatively flexible, provided that light propagation between the light transmitting hole 110 and the optical component 200 is not blocked. Considering that space in the housing is very valuable, the reflection part 400 may be as close to an optical channel between the light transmitting hole 110 and the optical component 200 as possible. In the first state, the reflection part 400 is parallel to the axis direction of the light transmitting hole 110. In this case, the reflection part 400 may exactly avoid the optical channel, and does not need to be too far away from the optical channel, so that a rotation amplitude of the reflection part 400 is smaller, and space required for rotation of the reflection part 400 is further reduced, thereby facilitating arrangement of the components in the housing.

In an optional embodiment, the housing of the terminal device may further include a mounting base 500. The mounting base 500 may be mounted on a middle frame, and the reflection part 400 is hinged to the mounting base 500, to be rotatably disposed in the housing. The mounting base 500 has a mounting surface 511, and the secondary display assembly 300 is disposed on the mounting surface 511. The mounting surface 511 herein may be disposed as a plane. When the secondary display assembly 300 is disposed along the axis direction of the light transmitting hole 110, the mounting surface 511 is parallel to the axis direction of the light transmitting hole 110. The mounting base 500 implements mounting of the secondary display assembly 300 and the reflection part 400 in the housing at the same time, so that relative position accuracy between the secondary display assembly 300 and the reflection part 400 can be better ensured, and output accuracy of the information displayed on the secondary display assembly 300 is further improved.

Figure 6:
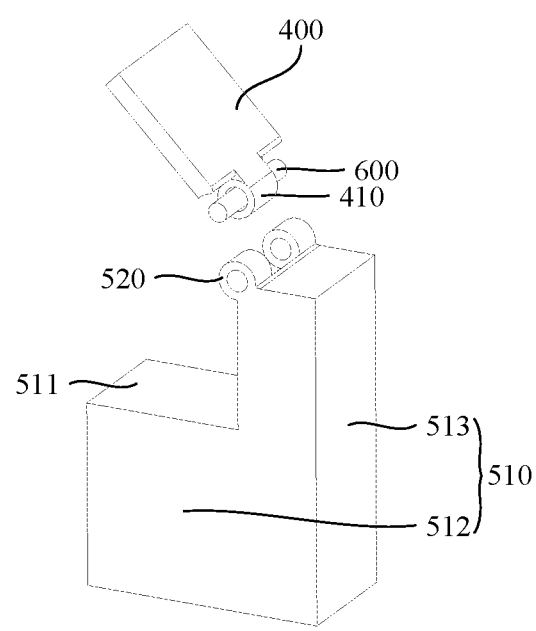
FIG. 6 is an exploded diagram of a reflection part and a mounting base in a terminal device according to an embodiment of the present disclosure.

There are many options for a hinge structure between the reflection part 400 and the mounting base 500. For example, the reflection part 400 may be connected by using a flexible connector, and the flexible connector may be deformed, so that the reflection part 400 may rotate relative to the mounting base 500. However, in this manner, position accuracy of the reflection part 400 relative to the mounting base 500 is relatively low, so that relative position accuracy of the reflection part 400 relative to the secondary display assembly 300 cannot be reliably ensured. In view of this, as shown in FIG. 6, in this embodiment of the present disclosure, the mounting base 500 may include a base body 510 and a first sleeve 520 disposed on the base body 510. The base body 510 is provided with the foregoing mounting surface 511, the reflection part 400 is provided with a second sleeve 410, and the reflection part 400 and the mounting base 500 are hinged by a rotation shaft 600 that penetrates the first sleeve 520 and the second sleeve 410. A contact area between the rotation shaft 600 and both the first sleeve 520 and the second sleeve 410 is relatively large. Therefore, when the reflection part 400 rotates relative to the mounting base 500, position accuracy between the reflection part 400 and the mounting base 500 is more easily ensured.

Only one first sleeve 520 and only one second sleeve 410 may be disposed. However, to improve stability in a rotation process of the reflection part 400 and position precision of the reflection part 400 relative to the mounting base 500, at least one of the first sleeve 520 or the second sleeve 410 may be disposed in a plural form, and the first sleeve 520 and the second sleeve 410 may be alternately arranged.

Optionally, to help limit the rotation amplitude of the reflection part 400, one of the first sleeve 520 and the second sleeve 410 is disposed with a stopping convex part, and the other is disposed with a stopping groove, where the stopping convex part extends into the stopping groove, and both the first sleeve 520 and the second sleeve 410 cooperate with an upper limit in a relative rotation direction of the first sleeve 520 and the second sleeve 410. When the first sleeve 520 rotates relative to the second sleeve 410, the stopping convex part slides in the stopping groove, and when the stopping convex part slides to a sidewall of the stopping groove, the sidewall prevents the stopping convex part from continuing to slide, so that the first sleeve 520 and the second sleeve 410 cannot continue to rotate relative to each other, to achieve the foregoing purpose. It should be noted that both rotation amplitudes of the reflection part 400 in two opposite directions may be limited by the stopping convex part and the stopping groove herein. Specifically, when the stopping convex part cooperates with an upper limit in one of sidewalls of the stopping groove, a rotation amplitude of the reflection part 400 in one direction may be limited. When the stopping convex part cooperates with an upper limit in another sidewall of the stopping groove, a rotation amplitude of the reflection part 400 in another direction may be limited.

When the terminal device works, the reflection part 400 moves frequently. If the secondary display assembly 300 is relatively close to the reflection part 400, once a moving range of the reflection part 400 exceeds a preset range, the reflection part 400 easily collides with the secondary display assembly 300, and consequently, the secondary display assembly 300 is damaged. To prevent this case, the foregoing base body 510 may include a mounting part 512 and a protrusion part 513, where the protrusion part 513 is connected to the mounting part 512, the protrusion part 513 protrudes from the mounting part 512, the mounting surface 511 is located on the mounting part 512, and the first sleeve 520 is disposed on the protrusion part 513. After such setting, a distance between the reflection part 400 and the secondary display assembly 300 increases. Even if the moving range of the reflection part 400 is abnormal, the secondary display assembly 300 does not easily collide with the reflection part 400, and therefore, a working life of the secondary display assembly 300 is prolonged. In addition, the secondary display assembly 300 may be located between the display component 100 and the protrusion part 513, so that the protrusion part 513 may separate the secondary display assembly 300 from another component, to prevent light emitted or reflected by another component from affecting normal display of the secondary display assembly 300, thereby improving a display effect of the secondary display assembly 300.

In this embodiment of the disclosure, the housing 700 usually has a frame, the frame includes a top part, and the reflection part 400 and the secondary display assembly 300 may be arranged in a direction perpendicular to the top part (that is, a Y direction in FIG. 3), to facilitate structural design of the terminal device. Specifically, the reflection part 400 may be closer to the top part of the frame than the secondary display assembly 300, or the secondary display assembly 300 may be closer to the top part of the frame than the reflection part 400. In view of a fact that there are a relatively large number of components that need to be arranged at the top part, space is smaller, and interference is easily caused between components, in some optional embodiments, the reflection part 400 is closer to the top part of the frame than the secondary display assembly 300, in other words, the reflection part 400 is located between the top part of the frame and the secondary display assembly 300.

The terminal device disclosed in the embodiments of the present disclosure may be a smartphone, a tablet computer, an e-book reader, or a wearable device. Certainly, the terminal device may also be another device, which is not limited in this embodiment of the present disclosure.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, and are not intended to limit the present disclosure. For a person skilled in the art, various changes and variations may be made in the present disclosure. Any modification, equivalent replacement, and improvement made in the principles of the present disclosure shall be included in the scope of the claims of the present disclosure.

What is claimed is:

1. A terminal device, comprising:
   a housing;
   a display assembly, wherein the display assembly is disposed on the housing, and a light transmitting hole is disposed on the display assembly;
   an optical component, wherein the optical component is disposed in the housing, and the optical component is opposite to the light transmitting hole;
   a secondary display assembly, wherein the secondary display assembly is disposed in the housing;
   a reflection part, wherein the reflection part is movably disposed in the housing; and
   a drive component, wherein the drive component is disposed in the housing, and the drive component is connected to the reflection part, and drives the reflection part to move between a first state and a second state; in the first state, the reflection part is located outside an optical channel between the optical component and the light transmitting hole; and in the second state, the reflection part is located between the light transmitting hole and the optical component, and reflect, to the light transmitting hole, light emitted by the secondary display assembly.

2. The terminal device according to claim 1, wherein the secondary display assembly is parallel to an axis direction of the light transmitting hole.

3. The terminal device according to claim 2, wherein in the second state, an included angle between the reflection part and the secondary display assembly is 45°.

4. The terminal device according to claim 1, wherein the reflection part is hinged to the housing, and the drive component drives the reflection part to rotate relative to the housing.

5. The terminal device according to claim 4, wherein in the first state, the reflection part is parallel to an axis direction of the light transmitting hole.

6. The terminal device according to claim 4, wherein the housing comprises a mounting base, the reflection part is hinged to the mounting base, the mounting base has a mounting surface, and the secondary display assembly is disposed on the mounting surface.

7. The terminal device according to claim 6, wherein the mounting base comprises a base body and a first sleeve disposed on the base body, the base body is provided with the mounting surface, the reflection part is provided with a second sleeve, and the reflection part and the mounting base are hinged by using a rotation shaft that penetrates the first sleeve and the second sleeve.

8. The terminal device according to claim 7, wherein one of the first sleeve and the second sleeve is disposed with a stopping convex part, and the other is disposed with a stopping groove, wherein the stopping convex part extends into the stopping groove, and in a relative rotation direction of the first sleeve and the second sleeve, the stopping convex part is fitted with the stopping groove cooperate for position limitation.

9. The terminal device according to claim 7, wherein the base body comprises a mounting part and a protrusion part, the protrusion part is connected to the mounting part, the protrusion part protrudes from the mounting part, the mounting part is located on the mounting part, and the first sleeve is disposed on the protrusion part.

10. The terminal device according to claim 1, wherein the reflection part is movably disposed in the housing.

11. The terminal device according to claim 1, wherein the housing has a frame, the frame comprises a top part, wherein the reflection part and the secondary display assembly are arranged in a direction perpendicular to the top part.

12. The terminal device according to claim 1, wherein the optical component comprises at least one of a camera, a sensor, or a supplement lamp.

* * * * *